(12) United States Patent
Hirabayashi et al.

(10) Patent No.: US 11,808,341 B2
(45) Date of Patent: Nov. 7, 2023

(54) ROTATING DEVICE

(71) Applicant: MINEBEA MITSUMI Inc., Nagano (JP)

(72) Inventors: Koichiro Hirabayashi, Kitasaku-gun (JP); Yukimasa Matsumura, Kitasaku-gun (JP); Jun Ohmura, Kitasaku-gun (JP); Kodai Kameoka, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/650,262

(22) Filed: Feb. 8, 2022

(65) Prior Publication Data

US 2022/0268350 A1    Aug. 25, 2022

(30) Foreign Application Priority Data

Feb. 22, 2021   (JP) ................................. 2021-026633

(51) Int. Cl.
*F16H 57/025*    (2012.01)
*F16H 57/028*    (2012.01)
(Continued)

(52) U.S. Cl.
CPC ......... *F16H 57/025* (2013.01); *F16H 57/028* (2013.01); *F16H 57/039* (2013.01);
(Continued)

(58) Field of Classification Search
CPC .... F16H 57/025; F16H 57/028; F16H 57/039; F16H 2057/02034; B60H 1/00857
See application file for complete search history.

(56) References Cited

U.S. PATENT DOCUMENTS 5,095,773 A * 3/1992 Okuzumi .............. F16H 57/028
74/606 R
9,024,627 B2 * 5/2015 Inoue ................. B60H 1/00857
324/156

(Continued)

FOREIGN PATENT DOCUMENTS

JP    H05252692 A  *  9/1993  ......... B60H 1/00671
JP    2018-207751 A     12/2018
(Continued)

OTHER PUBLICATIONS

Machine translation of KR 200217567 Y1, obtained from fit database (Year: 2001).*

(Continued)

*Primary Examiner* — Thomas C Diaz
(74) *Attorney, Agent, or Firm* — Pearne & Gordon LLP

(57) ABSTRACT

A rotating device includes a motor, a gear, and a housing configured to accommodate the motor and the gear. The housing includes a first housing, a second housing, and a joining element for joining the first housing and the second housing. The first housing includes a first attaching part attached to an external device. The second housing includes a second attaching part attached to the external device. The first attaching part and the second attaching part include surfaces opposing each other after the housing is assembled. The first attaching part and the second attaching part include the joining element.

5 Claims, 13 Drawing Sheets

(51) Int. Cl.
*H02K 7/116* (2006.01)
*H02K 5/24* (2006.01)
*F16H 57/039* (2012.01)
*F16H 57/02* (2012.01)

(52) U.S. Cl.
CPC ............. *H02K 5/24* (2013.01); *H02K 7/1166* (2013.01); *F16H 2057/02034* (2013.01)

(56) References Cited

U.S. PATENT DOCUMENTS

2003/0110885 A1* 6/2003 Beutler ................ F16H 57/037
74/606 R
2020/0156696 A1* 5/2020 Hara ....................... B62D 6/10

FOREIGN PATENT DOCUMENTS

| | | | | |
|---|---|---|---|---|
| JP | 2020-108234 A | 7/2020 | | |
| KR | 200217567 Y1 * | 5/2001 | ......... | B60H 1/00857 |
| KR | 200329732 Y1 * | 10/2003 | ......... | B60H 1/00857 |

OTHER PUBLICATIONS

Machine translation of KR 200329732 Y1, obtained from fit database (Year: 2003).*
Machine translation of JPH05252692 A, obtained from fit database (Year: 1993).*

* cited by examiner

ROTATING DEVICE

CROSS-REFERENCE TO RELATED APPLICATIONS

This application claims the benefit of priority to Japanese Application No. 2021-026633, filed Feb. 22, 2021, the entire disclosure of which is hereby incorporated herein by reference.

TECHNICAL FIELD

The present invention relates to a rotating device.

BACKGROUND ART

A known rotating device (motor actuator) includes a motor, a gear box, a sensor for detecting a rotational position (rotation angle) of the gear, and electronic components such as an IC (integrated circuit) for a LIN (local interconnect network) for controlling the operation of the motor.

CITATION LIST

Patent Literature

Patent Document 1: JP 2018-207751 A
Patent Document 2: JP 2020-108234 A

SUMMARY OF INVENTION

Technical Problem

Improving rigidity of a housing of a gear box in order to reduce noise and vibration generated from the gear box is known. However, although noise can be improved by improving rigidity in a high frequency range, it is difficult to improve noise in a low frequency range. In particular, in the low frequency range, a rigid body mode may be dominant in vibration characteristics of the housing of the gear box.

In one aspect, an object is to provide a rotating device capable of decreasing noise and vibration.

Solution to Problem

In one aspect, a rotating device includes a motor, a gear, and a housing for accommodating the motor and the gear. The housing includes a first housing, a second housing, and a joining element for joining the first housing and the second housing. The first housing includes a first attaching part attached to an external device. The second housing includes a second attaching part attached to the external device. The first attaching part and the second attaching part include surfaces opposing each other. The first attaching part and the second attaching part include the joining element.

According to one aspect, vibration and noise can be decreased.

DESCRIPTION OF EMBODIMENTS

Figure 1:
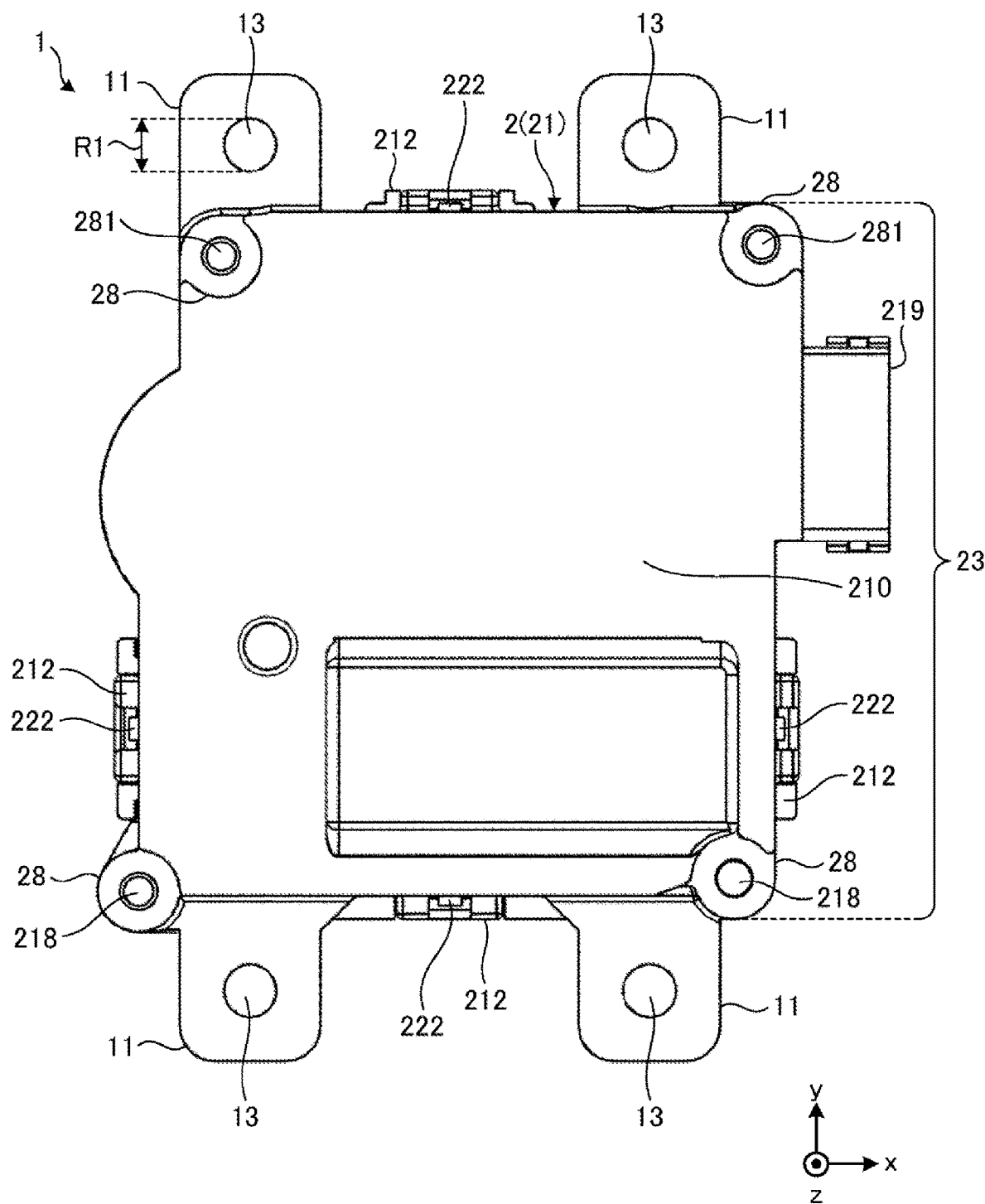
FIG. 1 is a plan view illustrating an example of a rotating device according to a first embodiment.

A rotating device disclosed in the present application will be described below with reference to the drawings. Note that the dimensional relationships, the proportions, and the like between elements in the drawings may differ from those in reality. Among the drawings, parts having mutually different dimensional relationships and proportions may be included. For the sake of clarity, a three-dimensional Cartesian coordinate system having an axis direction of an output shaft 51 described later as a Z-axis direction may be illustrated in each of the drawings.

First Embodiment

Figure 2:
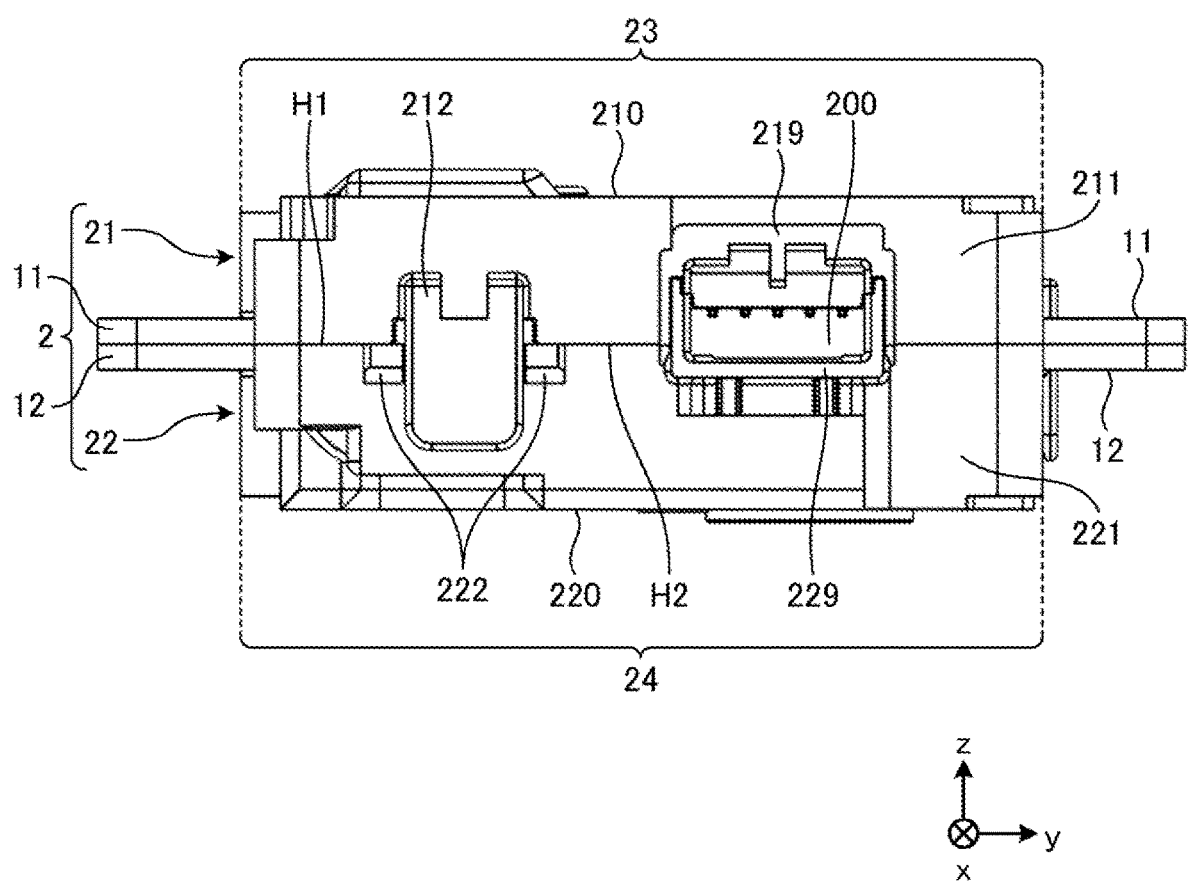
FIG. 2 is a side view illustrating an example of the rotating device according to the first embodiment.
Figure 3:
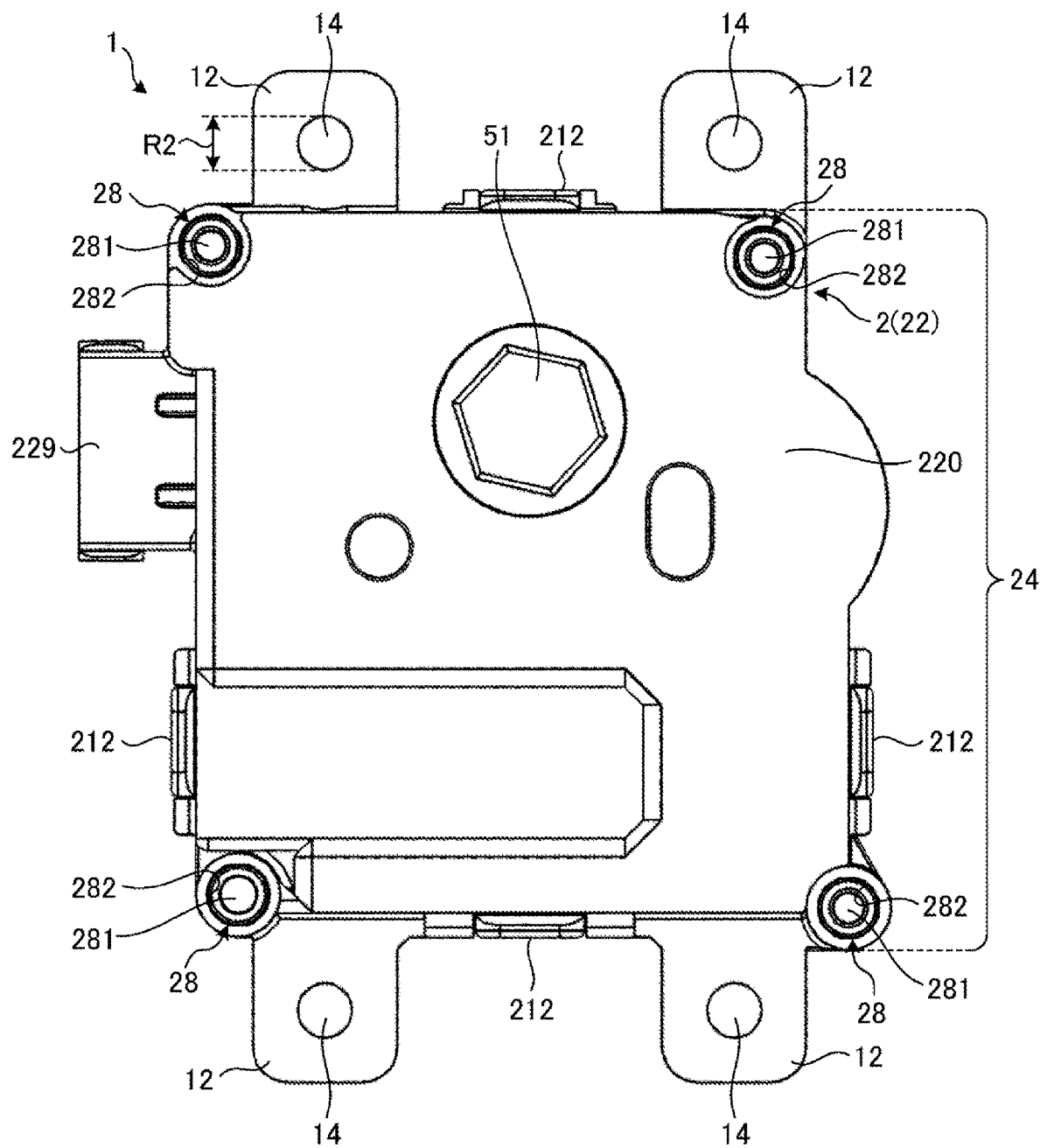
FIG. 3 is a bottom view illustrating an example of the rotating device according to the first embodiment.
Figure 4:
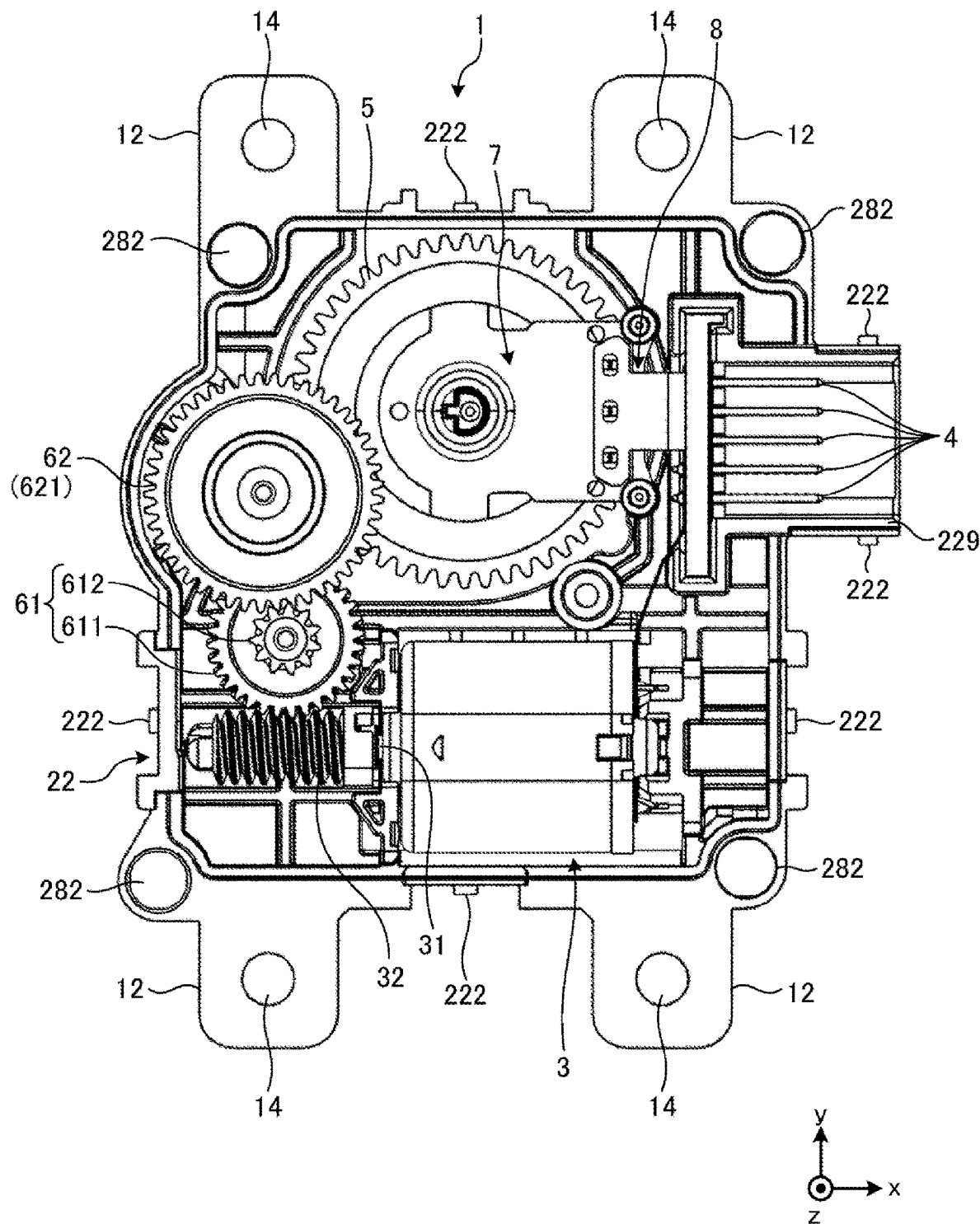
FIG. 4 is a plan view of the rotating device according to the first embodiment when a first housing is removed.
Figure 18:
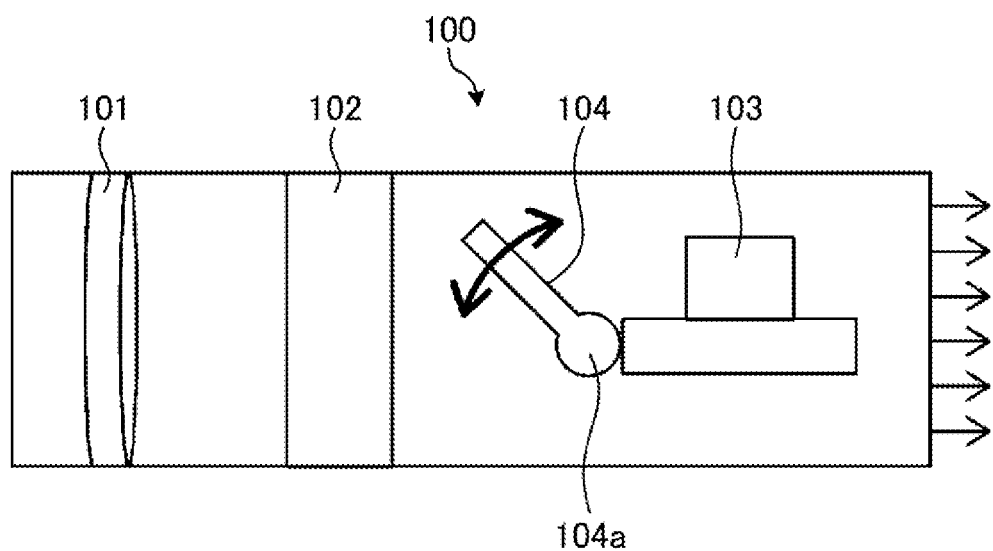
FIG. 18 is a schematic explanatory diagram illustrating an example of an air conditioning system including a rotating device according to an embodiment.

FIG. 1 is a plan view illustrating an example of a rotating device according to a first embodiment, FIG. 2 is a side view illustrating an example of the rotating device according to the first embodiment, and FIG. 3 is a bottom view illustrating an example of the rotating device according to the first embodiment. FIG. 4 is a plan view of the rotating device according to the first embodiment when a first housing is removed. FIG. 18 is a schematic explanatory diagram illustrating an example of an air conditioning system including a rotating device according to an embodiment.

A rotating device 1 according to an embodiment can be suitably used as, for example, an actuator used in an air conditioning system for a vehicle and can control the turning operation of a louver for controlling air flow or the like. Note that an air conditioning system 100 serves as an example of an external device.

The rotating device 1 according to the embodiment can be used as the air conditioning system 100 for a vehicle illustrated in FIG. 18, for example, and can control the turning operation of a louver 104 for controlling air flow or the like. The air conditioning system 100 for the vehicle includes a blower fan 101, an evaporator 102 for cooling air fed from the blower fan 101, and a heater 103 disposed downstream of the evaporator 102. The louver 104 configured to control a supply amount of air flowing from the evaporator 102 side to the heater 103 side is disposed between the evaporator 102 and the heater 103, and a drive shaft 104a of the louver 104 is rotated by the rotating device 1.

As illustrated in FIGS. 1 to 4, the rotating device 1 includes a housing 2 accommodating a power transmission mechanism inside. Here, specifically, the power transmission mechanism includes a motor 3 illustrated in FIG. 4, a plurality of gears (hereinafter referred to as a gear group) 6 for transmitting power from the motor 3, and a sensor 7 for detecting a rotation angle of an output gear 5 included in the gear group 6. Note that the sensor 7 may detect the number of rotations rather than the rotation angle of the output gear 5, or may detect both the rotation angle and the number of rotations.

The gear group 6 of the power transmission mechanism includes a worm gear 32 mounted at a rotation shaft 31 of the motor 3, a first transmission gear 61, a second transmission gear 62, and the output gear 5. In other words, as illustrated in FIG. 4, rotation of the worm gear 32 is transmitted to a helical gear 611 of the first transmission gear 61 and transmitted to a helical gear 621 of the second transmission gear 62 via a small diameter gear 612 provided coaxially with the helical gear 611 and having a small diameter compared to the helical gear 611. Rotation of the second transmission gear 62 is then transmitted to, for example, the output gear 5 via a small diameter gear (not illustrated) provided coaxially with the helical gear 621 and having a small diameter compared to the helical gear 621. The output gear 5 is provided with the output shaft 51 (FIG. 3). For example, an external shaft such as the drive shaft 104a of the louver 104 of the air conditioning system 100 described above is engaged with the output gear 5. Accordingly, rotational operation of the louver 104 can be controlled by rotating the output gear 5, and the air flow and the like of the air conditioning system 100 can be adjusted (see FIG. 18).

As described above, the rotation of the motor 3 is decelerated at a predetermined deceleration rate and output from the output shaft 51 to the outside. Then, the rotation angle of the output gear 5 is detected by the sensor 7. Information of the rotation angle of the output gear 5 detected by the sensor 7 is transmitted to the outside via five connection terminals 4 illustrated in FIG. 4.

Note that as the sensor 7 according to the present embodiment, for example, a rotary type and resistance type position sensor can be used to detect a change in resistance caused by displacement of a contact position of a brush with respect to a conductive part in the circumferential direction, with a sensor board including the conductive part and the conductive brush. However, the configuration of the sensor 7 is not necessarily limited to the configuration of the present embodiment. In the present embodiment, a DC motor is employed as the motor 3, but a brushless motor or a stepping motor may be employed. In a case where a brushless motor or a stepping motor is employed, the rotating device 1 may not require the sensor 7.

As illustrated in FIGS. 1 to 3, the housing 2 includes a first housing 21 and a second housing 22 opposing each other, and interference parts to be described below. In other words, the housing 2 is formed by connecting the first housing 21 (FIG. 1) and the second housing 22 (FIG. 3). Note that, when describing the vertical positional relationship, a state where the first housing 21 of the rotating device 1 is positioned at an upper side (Z-axis positive direction side) in an opposing manner and the second housing 22 is positioned at a lower side (Z-axis negative direction side) is used as a reference.

As illustrated in FIG. 1, the first housing 21 includes a main body part 23 and first attaching parts 11 protruding in a Y-axis direction from the main body part 23. As illustrated in FIG. 3, the second housing 22 includes a main body part 24 and second attaching parts 12 protruding in the Y-axis direction from the main body part 24. Further, the first housing 21 including the first attaching parts 11 and the second housing 22 including the second attaching parts 12 are both formed of a resin member having elasticity or being deformable, such as polypropylene, polyethylene terephthalate, ABS, or polycarbonate. The first attaching parts 11 and the second attaching parts 12 include surfaces opposing each other, and the surface of the first attaching part 11 or the surface of the second attaching part 12 includes the interference part.

As illustrated in FIGS. 1 and 2, the main body part 23 of the first housing 21 includes a first surface part 210 serving as a top surface part of the housing 2, and a first side wall part 211 provided at an outer peripheral part of the first surface part 210. As illustrated in FIGS. 2 and 3, the main body part 24 of the second housing 22 includes a second surface part 220 serving as a bottom surface part of the housing 2 and a second side wall part 221 provided at an outer peripheral part of the second surface part 220. As illustrated in FIG. 2, a horizontal surface H1 in contact with the main body part 24 of the second housing 22 is formed at a lower side (Z-axis negative direction side) of the main body part 23 of the first housing 21. Similarly, a horizontal surface H2 in contact with the main body part 23 of the first housing 21 is formed at an upper side (Z-axis positive direction side) of the main body part 24 of the second housing 22. In the present embodiment, the horizontal surfaces H1 and H2 are formed, for example, so as to substantially coincide with the Y-axis.

As illustrated in FIGS. 1 and 2, in the main body part 23 of the first housing 21, a plurality of engagement parts 212 extending toward the second housing 22 side are integrally formed at an outer peripheral part of the first side wall part 211. On the other hand, as illustrated in FIGS. 1 and 4, in the main body part 24 of the second housing 22, a plurality of projections 222 (hereinafter, referred to as "engagement projections") respectively corresponding to the plurality of engagement parts 212 of the first housing 21 are integrally formed at the second side wall part 221. The plurality of engagement projections 222 engage with the plurality of engagement parts 212.

Thus, the housing 2 is formed by abutting the first housing 21 and the second housing 22 against each other (see FIG. 2). In other words, by engaging the engagement projections 222 of the second housing 22 with the engagement parts 212 of the first housing 21, the first housing 21 and the second housing 22 are integrated, and the housing 2 accommodating the power transmission mechanism including the motor 3 and the gear group 6 described above is formed.

Note that, in the present embodiment, although the engagement parts 212 are provided in the first housing 21 and the engagement projections 222 are provided in the second housing 22, the engagement parts 212 may be provided in the second housing 22 and the engagement projections 222 may be provided in the first housing 21.

As illustrated in FIGS. 1 to 3, projected parts 219 and 229 corresponding to each other are formed at the main body part 23 of the first housing 21 and the main body part 24 of the second housing 22, respectively. In the present embodiment, the projected parts 219 and 229 protrude in an extending direction of the connection terminals 4. The projected parts 219 and 229 are bonded together to form a connector part 200 (FIG. 2). As illustrated in FIG. 4, the plurality of (five, for example) connection terminals 4 are held at the connector part 200. Note that the projected part 229 is an example of a part of the housing.

Further, as illustrated in FIG. 4, the rotating device 1 according to the present embodiment includes a flexible wiring board 8 serving as a substrate for connecting the connection terminals 4 to the motor 3 and the sensor 7. An input/output signal for driving the motor 3 is obtained from the outside via the wiring board 8 and the connection terminals 4, and a signal corresponding to the rotation angle of the output gear 5 from the sensor 7 is output to the outside.

The wiring board 8 is, for example, a so-called FPC (flexible printed circuit) formed of a flexible film. The flexible wiring board 8 has a structure, and in the structure, an adhesive layer is formed at a base film (resin substrate) having a thickness of, for example, from approximately 12 µm to approximately 50 µm, and a conductor having a thickness of, for example, from approximately 12 µm to approximately 50 µm is printed or bonded on the adhesive layer. The base film is formed of, for example, an insulating resin material such as polyimide or polyester. The conductor is formed of a metal material such as copper. Note that the adhesive layer is formed of an epoxy-based resin or an acryl-based resin. The wiring board 8 is a flexible board, and the flexible board can be bent and be restored to a shape before bending even when bent at an angle of 90 degrees or more.

In the configuration of the housing 2 described above, in the present embodiment, the projected parts 28 are provided at corner parts of the first side wall part 211 forming the outer peripheral part of the main body part 23 of the first housing 21, and second through-holes 282 are provided at corner parts of the main body part 24 of the second housing 22. In other words, in the first housing 21, the cylindrical projected parts 28 including the first through-holes 281 are formed to protrude from the first surface part 210. A fastener (not illustrated) such as a bolt or a screw can be inserted through each of the first through-holes 281. The second housing 22 is provided with the second through-holes 282, and the projected parts 28 are fitted into the second through-holes 282.

A plurality of the projected parts 28 are provided, and a plurality of the second through-holes 282 are also provided accordingly. The plurality of projected parts 28 are provided at a plurality (four) of the corner parts of the main body part 23 of the first housing 21, and the plurality of second through-holes 282 are also provided at a plurality (four) of the corner parts of the main body part 24 of the second housing 22. In the present embodiment, the first surface part 210 of the first housing 21 and the second surface part 220 of the second housing 22 have a substantially rectangular shape in plan view, and the projected parts 28 and the second through-holes 282 are respectively provided at the corner parts at the four corners of the main body parts 23 and 24.

As illustrated in FIG. 1, the first attaching parts 11 serving as pieces each protruding outward (in the Y-axis direction) are formed at both end parts of one side (X-axis direction) of the first housing 21. Similarly, as illustrated in FIG. 3, the second attaching parts 12 serving as pieces each protruding outward (in the Y-axis direction) are formed at both end parts of one side (X-axis direction) of the second housing 22. Note that, as illustrated in FIGS. 1 and 3, a connecting hole 13 is formed in the first attaching part 11, and a connecting hole 14 is formed in the second attaching part 12. In the first embodiment, as illustrated in FIGS. 1 and 3, the holes (hereinafter referred to as "connecting holes") 13 and the holes (hereinafter referred to as "connecting holes") 14 are formed so that an inner diameter R1 of the connecting hole 13 and an inner diameter R2 of the connecting hole 14 are substantially the same. In the first embodiment, the housing 2 constituting the rotating device 1 is attached to the air conditioning system 100 via the connecting holes 13 and 14.

Figure 5:
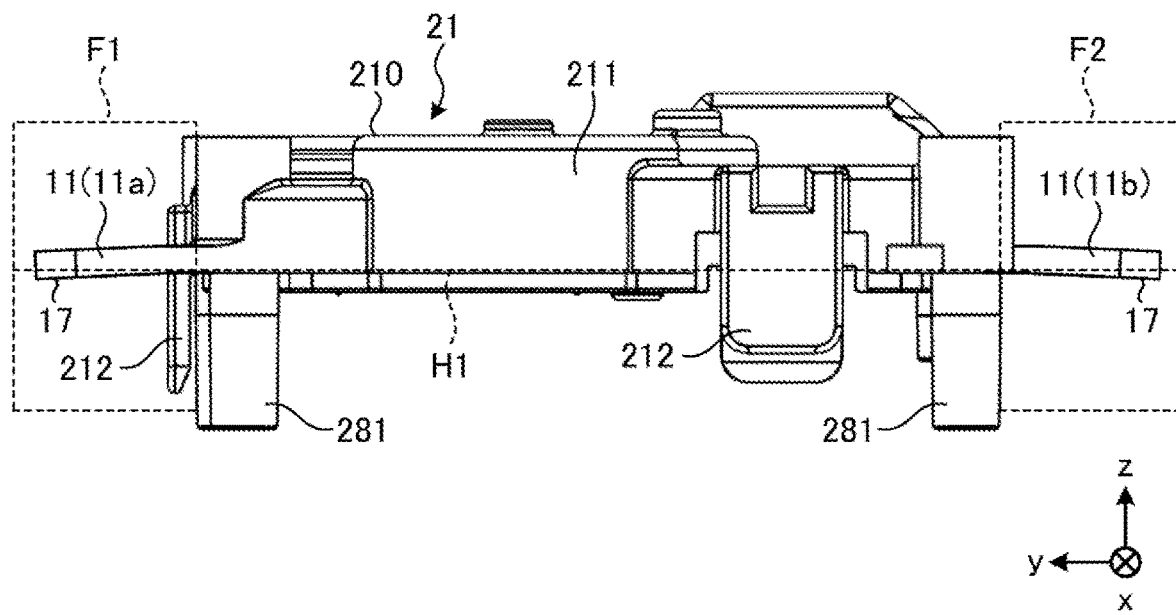
FIG. 5 is a side view illustrating an example of the first housing according to the first embodiment.
Figure 6:
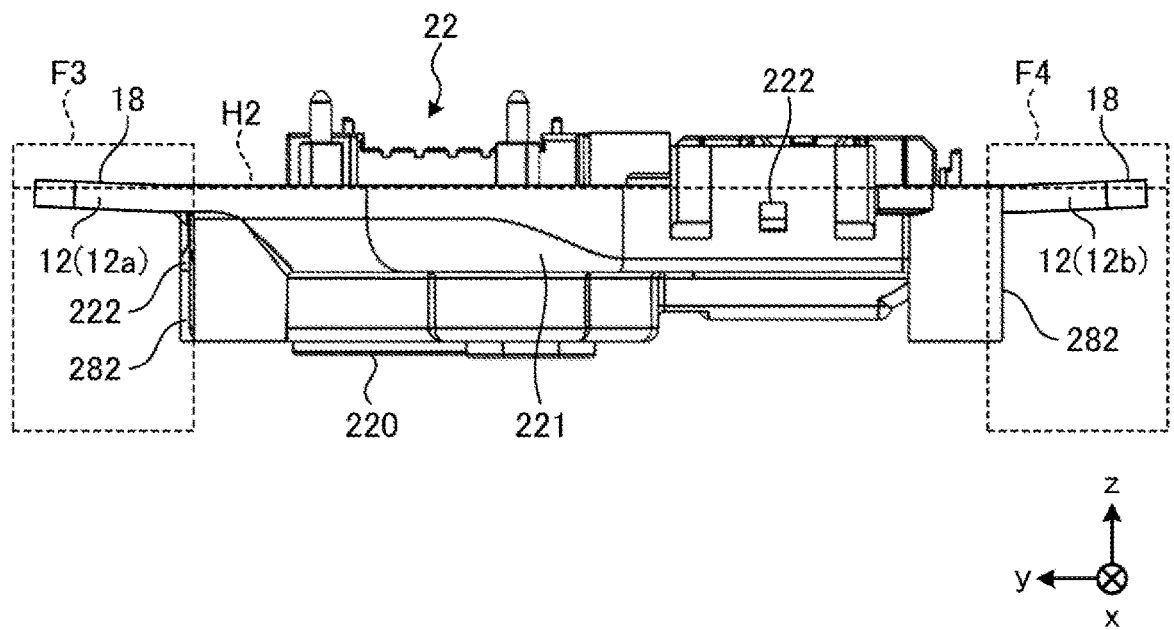
FIG. 6 is a side view illustrating an example of a second housing according to the first embodiment.

FIG. 5 is a side view illustrating an example of the first housing according to the first embodiment. FIG. 6 is a side view illustrating an example of the second housing according to the first embodiment. Note that, in the following, the first attaching parts 11 formed at the left side (Y-axis positive direction side) in FIG. 5 may be referred to as "first attaching parts 11a", and the first attaching parts 11 formed at the right side (Y-axis negative direction side) in FIG. 5 may be referred to as "first attaching parts 11b". Similarly, the second attaching parts 12 formed at the left side (Y-axis positive direction side) in FIG. 6 may be referred to as "second attaching parts 12a", and the second attaching parts 12 formed at the right side (Y-axis negative direction side) in FIG. 6 may be referred to as "second attaching parts 12b".

As illustrated in FIG. 5, the first attaching part 11 is inclined, so that an outer edge part in the Y-axis direction of the first attaching part 11 extends in a downward direction (Z-axis negative direction) in FIG. 5 with respect to the horizontal surface H1 of the main body part 23. The inclination of the first attaching part 11 is an inclination from the first housing 21 toward the second housing 22. Similarly, as illustrated in FIG. 6, the second attaching part 12 is inclined, so that an outer edge part in the Y-axis direction of the second attaching part 12 extends in an upward direction (Z-axis positive direction) in FIG. 6 with respect to the horizontal surface H2 of the main body part 24. The inclination of the second attaching part 12 is an inclination from the second housing 22 toward the first housing 21.

Figure 7A:
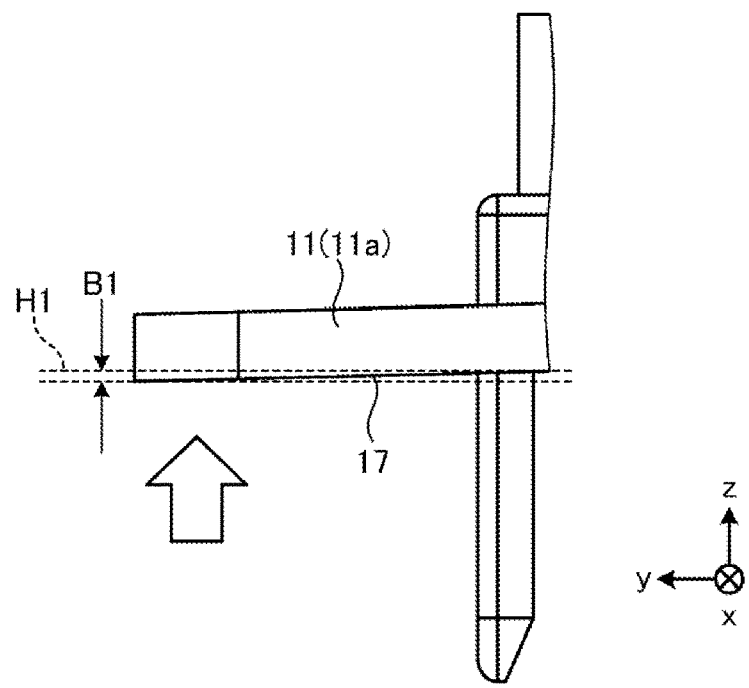
FIG. 7A is an enlarged side view illustrating an example of an attaching part of the first housing according to the first embodiment.
Figure 7B:
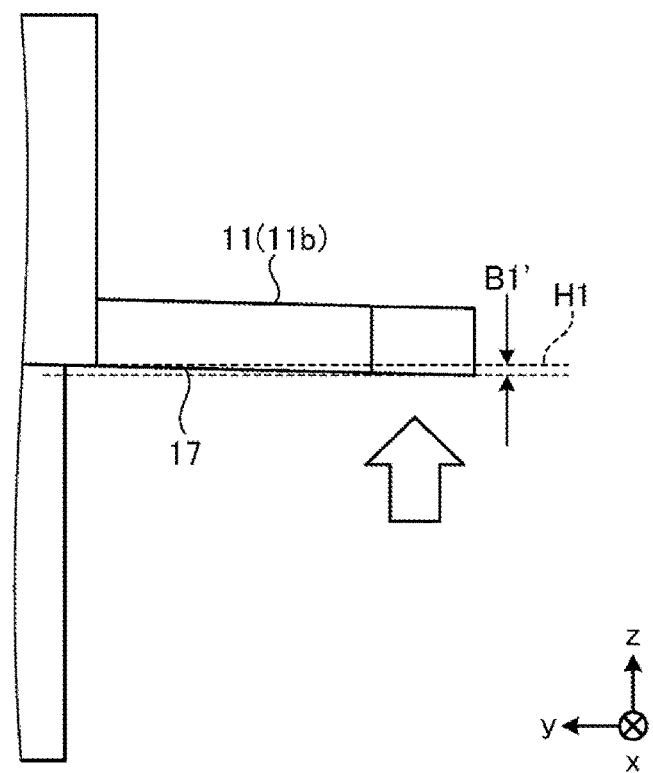
FIG. 7B is an enlarged side view illustrating another example of the attaching part of the first housing according to the first embodiment.

FIG. 7A is an enlarged side view illustrating an example of the attaching part of the first housing according to the first embodiment. FIG. 7B is an enlarged side view illustrating another example of the attaching part of the first housing according to the first embodiment. FIG. 7A is an enlarged view of a part illustrated in a frame F1 of FIG. 5. FIG. 7B is an enlarged view of a part illustrated in a frame F2 of FIG. 5.

As illustrated in FIG. 7A, the first attaching part 11a extending toward the Y-axis positive direction side of the first housing 21 is inclined to the lower side (Z-axis negative direction side) with respect to the horizontal surface H1 by an interference amount (hereinafter referred to as a "displacement amount") B1. Further, as illustrated in FIG. 7B, the first attaching part 11b extending toward the Y-axis negative direction side of the first housing 21 is inclined to the lower side (Z-axis negative direction side) with respect to the horizontal surface H1 by a displacement amount B1'.

Figure 8A:
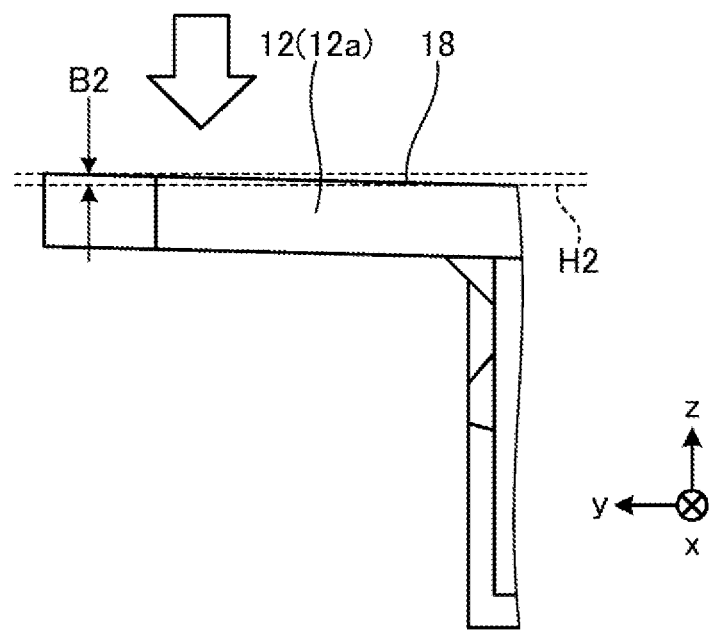
FIG. 8A is an enlarged side view illustrating an example of an attaching part of the second housing according to the first embodiment.
Figure 8B:
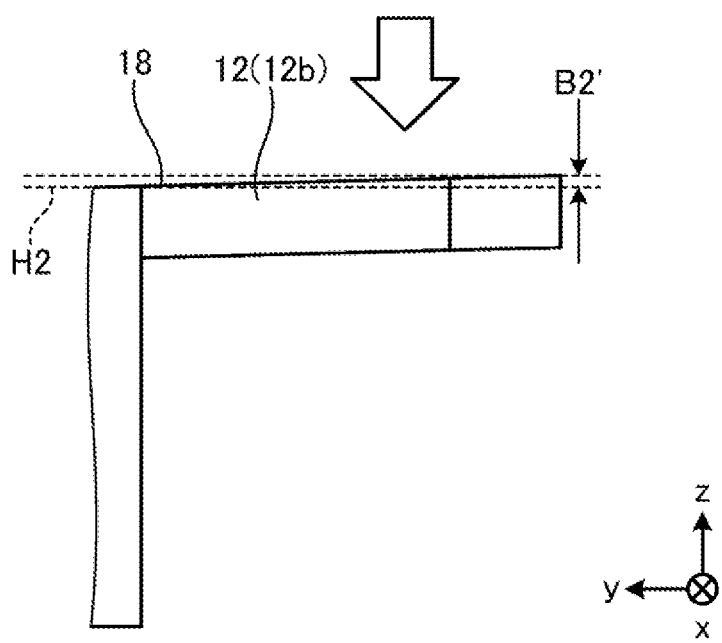
FIG. 8B is an enlarged side view illustrating another example of the attaching part of the second housing according to the first embodiment.

FIG. 8A is an enlarged side view illustrating an example of the attaching part of the second housing according to the first embodiment. FIG. 8B is an enlarged side view illustrating another example of the attaching part of the second housing according to the first embodiment. FIG. 8A is an enlarged view of a part illustrated in a frame F3 of FIG. 6. FIG. 8B is an enlarged view of a part illustrated in a frame F4 of FIG. 6.

As illustrated in FIG. 8A, the second attaching part 12a at the Y-axis positive direction side of the second housing 22 is inclined to the upper side (Z-axis positive direction side) with respect to the horizontal surface H2 by a displacement amount B2. As illustrated in FIG. 8B, the second attaching part 12b at the Y-axis negative direction side of the second housing 22 is inclined to the upper side (Z-axis positive direction side) with respect to the horizontal surface H2 by a displacement amount B2'. Note that the displacement amounts B1, B1', B2, and B2' are examples of the interference amount. In the first embodiment, the displacement amounts B1, B1', B2, and B2' are substantially equal.

The first attaching parts 11 and the second attaching parts 12 are fixed by a bonding member (not illustrated) such as an adhesive. The first housing 21 and the second housing 22 form an integrated housing 2 by bonding the first attaching parts 11 and the second attaching parts 12 to each other.

In the first embodiment, the adhesive is applied to, for example, a surface (inclined surface) 17 at the Z-axis negative direction side of the first attaching part 11 as illustrated in FIG. 5, that is, the surface opposing the second attaching part 12. Similarly, the adhesive is applied to, for example, a surface (inclined surface) 18 at the Z-axis positive direction side of the second attaching part 12 as illustrated in FIG. 6, that is, the surface opposing the first attaching part 11. Note that the inclined surfaces 17 and 18 are examples of the interference part.

Figure 9A:
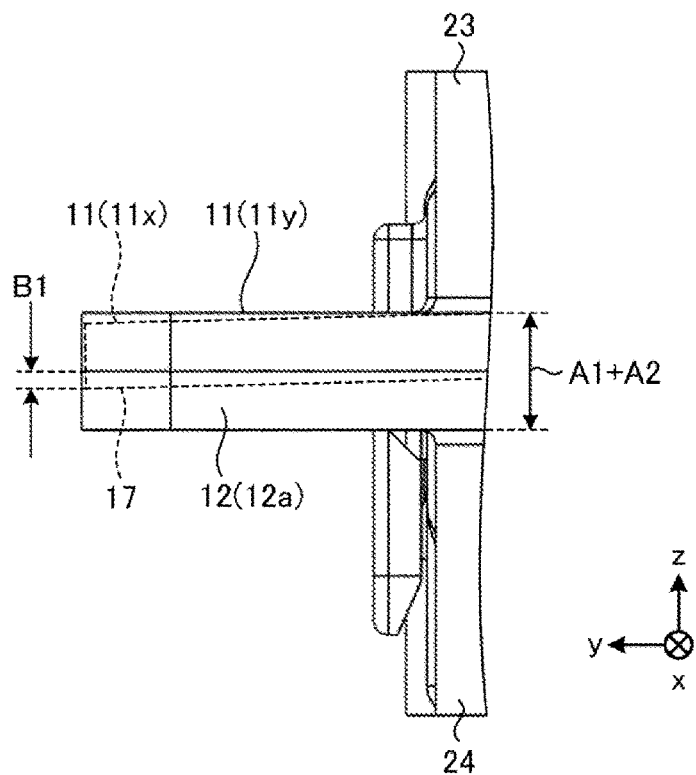
FIG. 9A is an enlarged side view illustrating an example of the attaching part of the rotating device after joining according to the first embodiment.
Figure 9B:
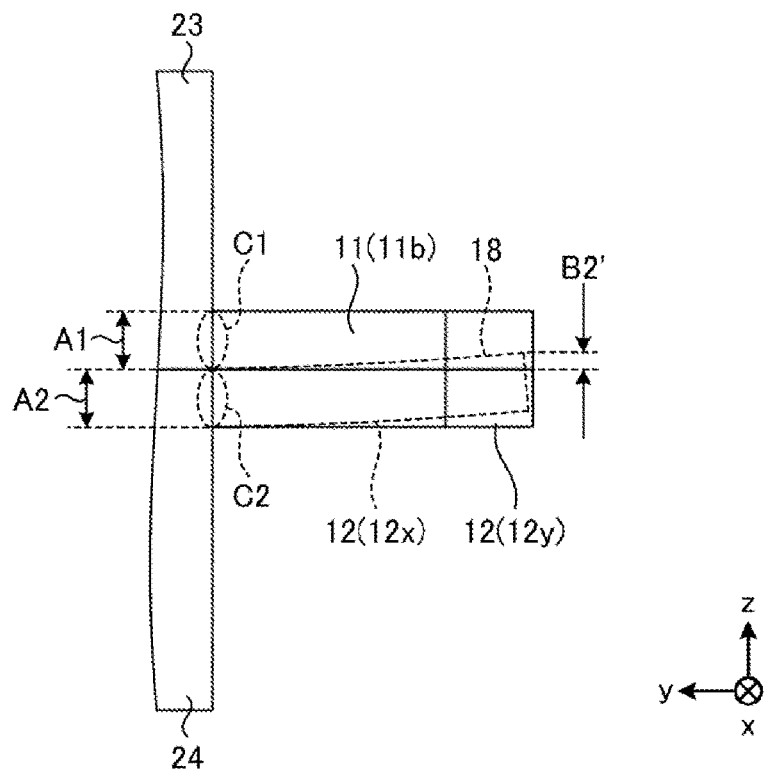
FIG. 9B is an enlarged side view illustrating another example of the attaching part of the rotating device after joining according to the first embodiment.

By bonding the first attaching part 11 and the second attaching part 12, the attaching part illustrated in FIGS. 9A and 9B is formed. FIG. 9A is an enlarged side view illustrating an example of the attaching part of the rotating device after joining according to the first embodiment. FIG. 9B is an enlarged side view illustrating another example of the attaching part of the rotating device after joining according to the first embodiment. Note that in FIG. 9A, the first attaching part 11 (11a) before deformation may be referred to as a "first attaching part 11x", and the first attaching part 11a after deformation may be referred to as a "first attaching part 11y". Similarly, in FIG. 9B, the second attaching part 12 (12b) before deformation may be referred to as a "second attaching part 12x", and the second attaching part 12b after deformation may be referred to as a "second attaching part 12y".

As illustrated in FIG. 9A, when the first attaching part 11a provided with the inclined surface 17 is bonded to the second attaching part 12 (12a), the inclined surface 17 is pressed by the second attaching part 12a. At this time, the inclined surface 17 elastically deforms in the direction of the arrow (Z-axis positive direction) illustrated in FIG. 7A to be substantially flush with the horizontal surface H1 of the main body part 23, and thus stress is generated inside the first attaching part 11. In other words, the first attaching part 11y after deformation is subject to interference corresponding to the displacement amount B1 with respect to the first attaching part 11x before deformation.

Similarly, in FIG. 9B, when the second attaching part 12b provided with the inclined surface 18 is bonded to the first attaching part 11 (11b), the inclined surface 18 is pressed by the first attaching part 11b. Accordingly, the inclined surface 18 elastically deforms in the direction of the arrow (Z-axis negative direction) illustrated in FIG. 8B to be substantially flush with the horizontal surface H2 of the main body part 24, and thus stress is generated inside. In other words, the second attaching part 12y after deformation is subject to interference corresponding to the displacement amount B2' with respect to the second attaching part 12x before deformation.

In this case, the inclined surface 17 of the first attaching part 11y and the inclined surface 18 of the second attaching part 12a in contact with each other in the Z-axis direction are biased against each other. Similarly, the inclined surface 17 of the first attaching part 11b and the inclined surface 18 of the second attaching part 12x in contact with each other in the Z-axis direction are biased against each other.

In this way, the stress generated in the first attaching parts 11 and the second attaching parts 12 cancels out vibration generated in the housing 2, and thus, vibration and noise generated in the housing 2 are suppressed from being transmitted to the air conditioning system 100. As a result, noise and vibration generated by the rigid body mode of the housing 2 attached to the air conditioning system 100 can be suppressed without changing the structure at the air conditioning system 100 side or the structures of the main body parts 23 and 24 of the housing 2. Further, according to the first embodiment, resonance between the first housing 21 and the second housing 22 can be suppressed, so that vibration and noise can be attenuated.

A bonding member such as an adhesive may be used between the inclined surface 17 of the first attaching part 11 and the inclined surface 18 of the second attaching part 12. In this case, the amplitude of the vibration generated in the housing 2 can be reduced by the internal loss of the adhesive.

Note that magnitudes of the displacement amount B1 of the first attaching part 11 and the displacement amount B2 of the second attaching part 12 are arbitrarily determined in a range represented by, for example, the following Equation (1). Note that, as illustrated in FIGS. 9A and 9B, in the Equation (1) below, A1 represents a thickness (size in the Z-axis direction) at a contact point C1 between the first attaching part 11 and the main body part 23, and A2 represents a thickness at a contact point C2 between the second attaching part 12 and the main body part 24.

$$0.02(A1+A2) \leq B1+B2 \leq 2(A1+A2) \quad \text{Equation (1)}$$

The magnitude of the stress generated at the first attaching part 11 including the interference part changes according to the displacement amount B1. Similarly, the magnitude of the stress generated at the second attaching part 12 including the interference part changes according to the displacement amount B2. That is, in the first embodiment, by changing the displacement amounts B1 and B2, the magnitudes of the stress generated in the first attaching part 11 and the second attaching part 12 can be easily adjusted.

As described above, in the rotating device 1 according to the first embodiment, the motor 3 and the plurality of gears 5, 6 are provided in the housing 2. The housing 2 is configured of the first housing 21 and the second housing 22. The first housing 21 includes the first attaching parts 11 attached to the external device 100. The second housing 22 includes the second attaching parts 12 attached to the external device 100. The main body of the rotating device 1 is attached to the external device 100 via the attaching parts 11 and 12. The first attaching parts 11 and the second attaching parts 12 include the surfaces 17 and 18 opposing each other. Each interference part 17, 18 is provided at a surface of the first attaching part 11 or a surface of the second attaching part 12. According to the configuration, vibration and noise can be decreased.

Second Embodiment

Figure 10:
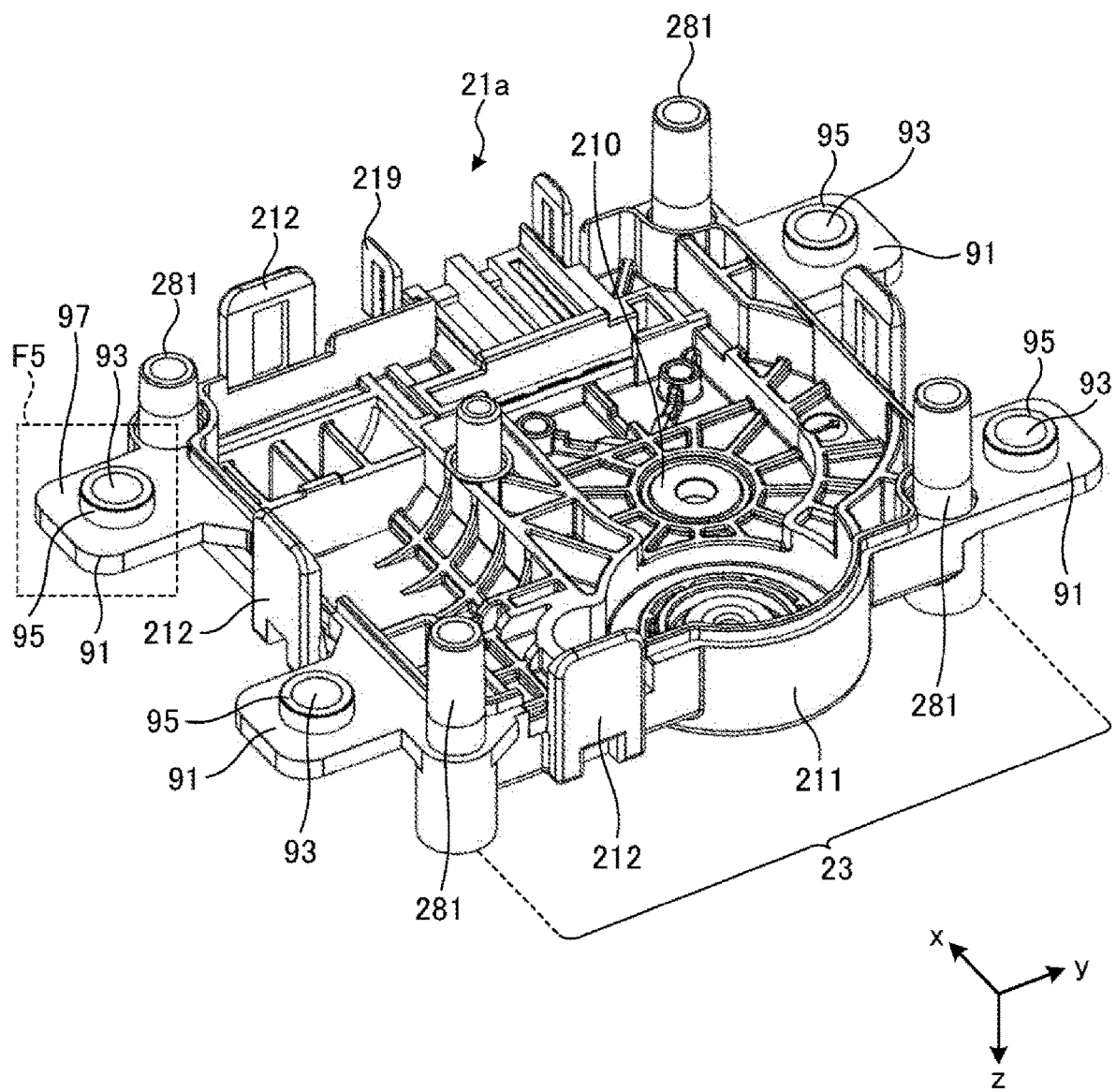
FIG. 10 is a perspective view illustrating an example of a first housing according to a second embodiment.
Figure 11:
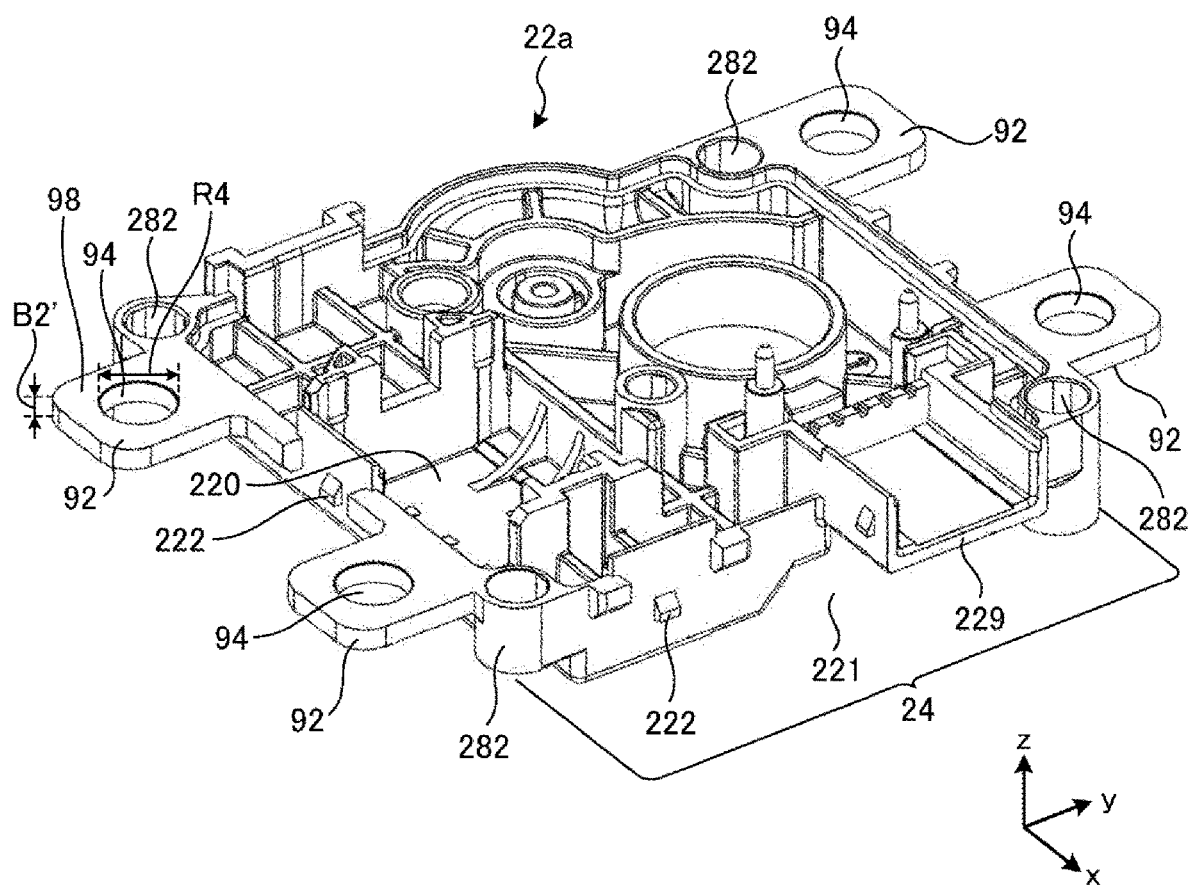
FIG. 11 is a perspective view illustrating an example of a second housing according to the second embodiment.
Figure 12:
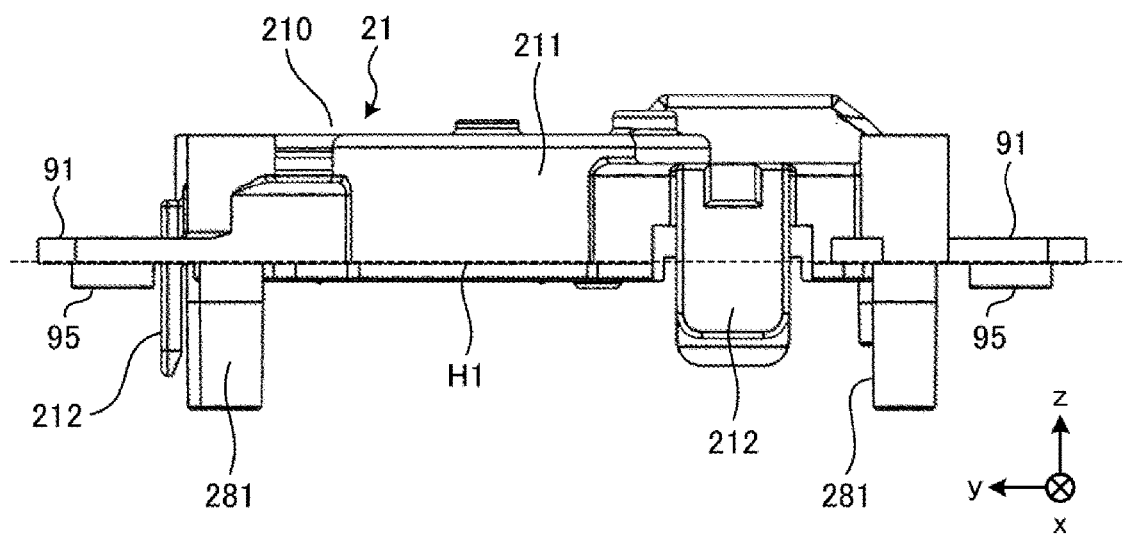
FIG. 12 is a side view illustrating an example of the first housing according to the second embodiment.

The first attaching parts 11 and the second attaching parts 12 described above may include surfaces opposing each other, and each of the surfaces opposing each other may include, for example, a joining element such as a fitting part. This joining element is an element for joining the first housing 21 and the second housing 22 of the housing 2, and the housing 2 includes the joining element. FIG. 10 is a perspective view illustrating an example of a first housing according to a second embodiment. FIG. 11 is a perspective view illustrating an example of a second housing according to the second embodiment. FIG. 12 is a side view illustrating an example of the first housing according to the second embodiment. Note that in the second embodiment, components identical to those of the first embodiment are denoted by the same reference signs, and specific descriptions will be omitted.

As illustrated in FIG. 10, a first housing 21a in the second embodiment includes a main body part 23 and first attaching parts 91. Note that as illustrated in FIG. 12, the first attaching part 91 of the second embodiment is not inclined with respect to the horizontal surface H1 such as in the first embodiment. As illustrated in FIG. 11, a second housing 22a in the second embodiment includes a main body part 24 and second attaching parts 92. In the second embodiment, the second attaching part 92 is not inclined with respect to the horizontal surface H2 such as in the first embodiment. Note that the first attaching part 91 and the second attaching part 92 may be inclined to a relatively small degree such that joining the first attaching parts 91 and the second attaching parts 92 by the joining elements is not difficult, or be inclined due to a tolerance.

Figure 13:
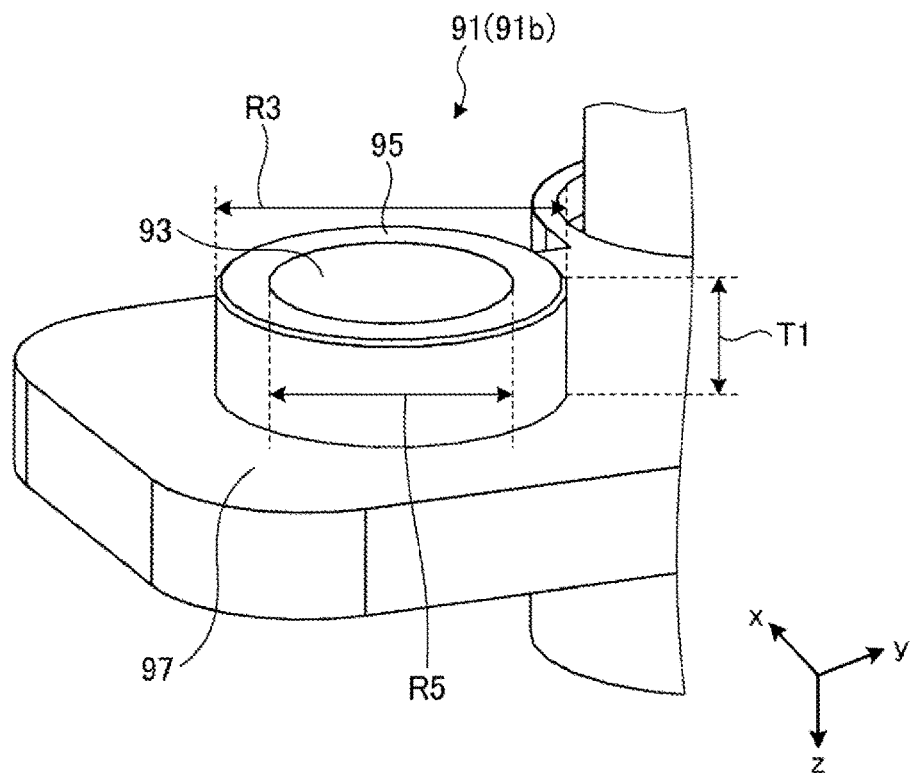
FIG. 13 is an enlarged perspective view illustrating an example of an attaching part of the first housing according to the second embodiment.

The first attaching parts 91 and the second attaching parts 92 in the second embodiment include surfaces 97 and 98 opposing each other, and the surface 97 of the first attaching part 91 and the surface 98 of the second attaching part 92 include a joining element. The joining element includes a protruding part 95 and a hole part 94 to be described later. Specifically, as illustrated in FIG. 10, the surface 97 of the first attaching part 91 includes the protruding part 95 serving as a part of the joining element and protruding toward the Z-axis negative direction. FIG. 13 is an enlarged perspective view illustrating an example of an attaching part of the first housing according to the second embodiment. FIG. 13 is an enlarged view of a part illustrated in a frame F5 of FIG. 10. Note that, in the following, the first attaching parts 91 formed at the right side (Y-axis positive direction side) in FIG. 10 may be referred to as "first attaching parts 91a", and the first attaching parts 91 formed at the left side (Y-axis negative direction side) in FIG. 10 may be referred to as "first attaching parts 91b". Similarly, the second attaching parts 92 formed at the left side (Y-axis positive direction side) in FIG. 11 may be referred to as "second attaching parts 92a", and the second attaching parts 92 formed at the right side (Y-axis negative direction side) in FIG. 11 may be referred to as "second attaching parts 92b".

As illustrated in FIG. 13, in the first attaching part 91 (91b), the protruding part 95 is formed into, for example, a tubular shape (cylindrical shape) and protrudes toward the Z-axis negative direction side from a surface at the Z-axis negative direction side of the first attaching part 91, that is, from the surface 97 opposing the second attaching part 92. A thickness (size in the Z-axis direction) T1 of the protruding part 95 is approximately the same as, for example, a thickness (size in the Z-axis direction) B2' of the second attaching part 92b illustrated in FIG. 11. Further, an insertion hole 93 is formed in the protruding part 95.

As illustrated in FIG. 11, the surface 98 of the second attaching part 92 in the second embodiment includes a hole part 94 serving as another part of the joining element. The hole part 94 is formed so as to extend through the second attaching part 92 in the Z-axis direction from a surface at the Z-axis positive direction side of the second attaching part 92, that is, from the surface 98 opposing the first attaching part 91. The hole part 94 is formed such that an inner diameter R4 of the hole part 94 is substantially the same as an outer diameter R3 of the protruding part 95 of the first attaching part 91 illustrated in FIG. 13.

Figure 14:
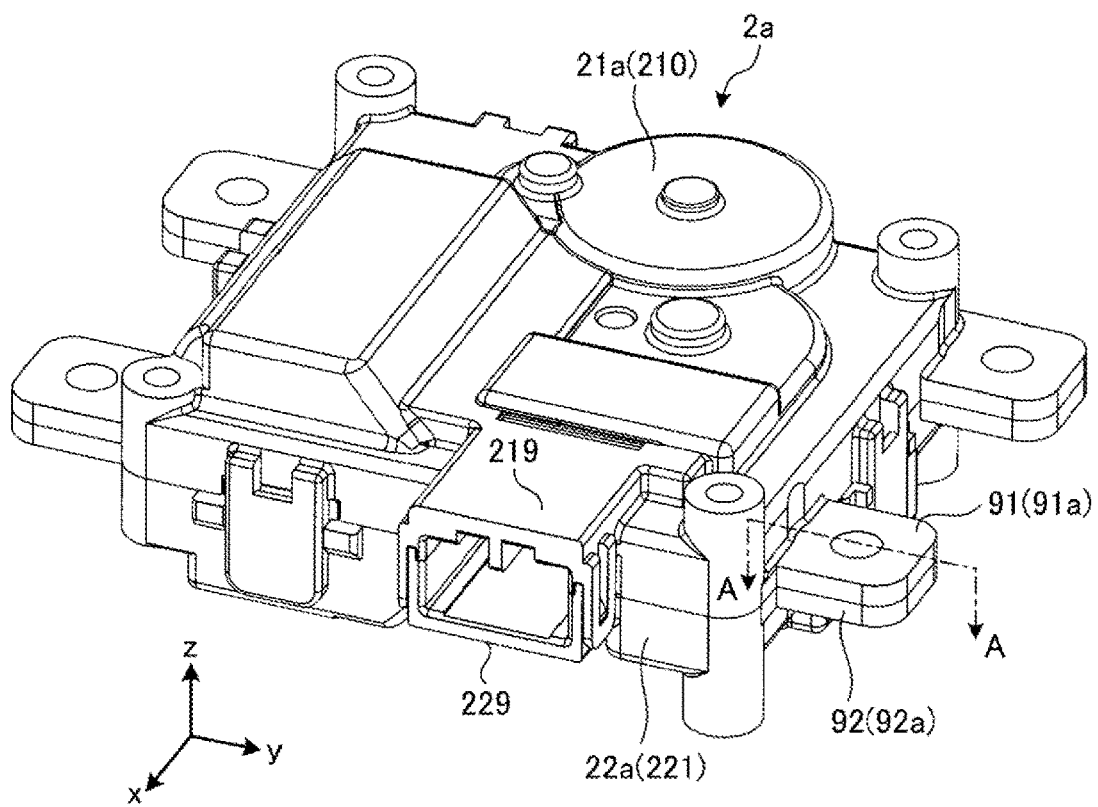
FIG. 14 is a perspective view illustrating an example of a rotating device according to the second embodiment.
Figure 15:
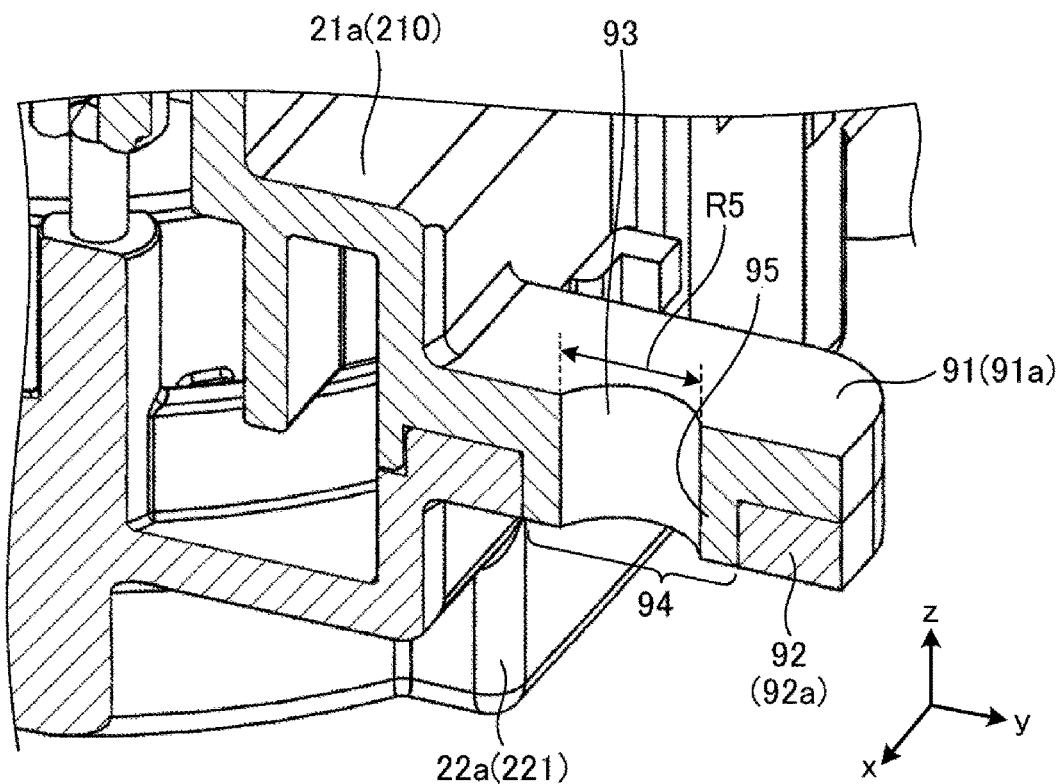
FIG. 15 is a cross-sectional perspective view illustrating an example of an attaching part of the rotating device after joining according to the second embodiment.

The first attaching part 91 engages or joins with the second attaching part 92 by the protruding part 95 being pressed into the hole part 94 of the second attaching part 92. As a result, the first attaching parts 91 and the second attaching parts 92 are joined, and the first housing 21a and the second housing 22a are connected to form the housing 2a. The housing 2a forms a rotating device 1a by accommodating the power transmission mechanism. FIG. 14 is a perspective view illustrating an example of a rotating device according to the second embodiment. FIG. 15 is a cross-sectional perspective view illustrating an example of an attaching part of the rotating device after joining according to the second embodiment. FIG. 15 illustrates a cross section taken along the line A-A in FIG. 14.

As illustrated in FIG. 15, the protruding part 95 of the first attaching part 91 is pressed into the hole part 94 of the second attaching part 92. In the second embodiment, an inner diameter R5 of the insertion hole 93 formed in the protruding part 95 illustrated in FIG. 15 is formed so as to be, for example, substantially the same as the inner diameter R1 of the connecting hole 13 formed in the first attaching part 11 in the first embodiment. As a result, similar to the first embodiment, the housing 2a forming the rotating device 1a is attached to the air conditioning system 100 via the insertion hole 93 formed at the protruding part 95 pressed into the hole part 94. Note that the protruding part 95 and the hole part 94 are examples of the joining element.

In this case, stress is also generated in a part where a side surface of the protruding part 95 of the first attaching part 91 and an inner peripheral surface of the hole part 94 of the second attaching part 92 are in contact with each other. In this way, the stress generated at the first attaching parts 91 and the second attaching parts 92 cancel out vibration generated in the housing 2a. As a result, noise and vibration generated by the rigid body mode of the housing 2a can be decreased.

As described above, the rotating device 1a according to the second embodiment includes the motor 3, the gear 5, and the housing 2a accommodating the motor 3 and the gear 5. The housing 2a includes the first housing 21a, the second housing 22a, and the joining element joining the first housing 21a and the second housing 22a. The first housing 21a includes the first attaching parts 91 attached to the external device 100. The second housing 22a includes the second attaching parts 92 attached to the external device 100. The first attaching parts 91 and the second attaching parts 92 include the surfaces 97 and 98 opposing each other, respectively. The first attaching parts 91 and the second attaching parts 92 include the joining elements 95 and 94, respectively. Even in such a configuration, vibration and noise can be decreased.

In the above-described configuration, the hole part 94 to be fitted into the protruding part 95 is formed in second attaching part 92 in the second embodiment, but the configuration is not limited to this, and a recess part to be fitted with the protruding part 95 may be formed instead of the hole part 94. In this case, for example, the thickness (length in the Z-axis direction) of the protruding part 95 may be formed so as to be substantially the same as the depth (length in the Z-axis direction) of the recess part. A hole part such that inner diameters of the hole part and the insertion hole 93 formed in the protruding part 95 are substantially the same may be further formed in the recess part.

The first attaching part 91 and the second attaching part 92 in the second embodiment are not inclined, but the configuration is not limited to this, and at least one of the first attaching part 91 and the second attaching part 92 may be configured to include the inclined surface 17 or 18. The first attaching parts 91 and the second attaching parts 92 are engaged or bonded via the protruding parts 95 and the hole parts 94 serving as the joining elements, but the configuration is not limited to this, and an adhesive having elasticity may be further used.

Modifications

The configuration of each of the embodiments has been described above, but the embodiments are not limited. For example, in the case described above, the displacement amount B1 illustrated in FIG. 7A and the displacement amount B1' illustrated in FIG. 7B are substantially equal, and the displacement amount B2 illustrated in FIG. 8A and the displacement amount B2' illustrated in FIG. 8B are substantially equal, but the embodiments are not limited to those. For example, as long as balance of the stress and the center of gravity of the entirety of the housing 2 can be ensured, the displacement amounts B1 and B1' may be uneven, that is, the first attaching parts 11a and the first attaching parts 11b may be configured to be asymmetric in the Y-axis direction. Similarly, the displacement amount B1 illustrated in FIG. 7A and the displacement amount B2 illustrated in FIG. 8A may be uneven. Further, the configuration may be such that only one of the inclination of the first attaching part 11 with respect to the horizontal surface H1 and the inclination of the second attaching part 12 with respect to the horizontal surface H2 is formed.

In this manner, in the case where the displacement amount B1 of the first attaching part 11 and the displacement amount B2 of the second attaching part 12 are uneven, when the displacement amounts B1 and B2 are combined to be a displacement amount B, the magnitude of the displacement amount B is arbitrarily determined in a range represented by, for example, the following Equation (2).

$$0.02(A1+A2) \leq B \leq 2(A1+A2) \quad \text{Equation (2)}$$

In the example described above, the entirety of the surface 17 at the Z-axis negative direction side of the first attaching part 11 and the entirety of the surface 18 at the Z-axis positive direction side of the second attaching part 12 each serve as the interference part, but a part protruding from the surface 17 or 18 may be the interference part.

Figure 16:
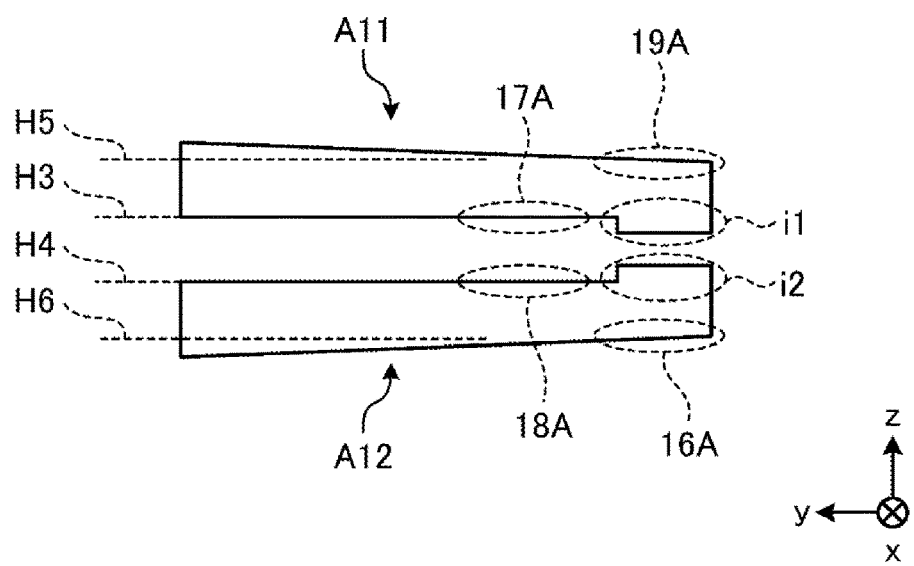
FIG. 16 is an enlarged side view illustrating an example of attaching parts of the first housing and the second housing according to a modified example.

FIG. 16 is a side view of an example of the attaching part of the first housing and the attaching part of the second housing in a modified example. As illustrated in FIG. 16, in the present modified example, an interference part i1 is formed at an end part at the Y-axis negative side of a first attaching part A11 of the first housing before joining. Similarly, an interference part i2 is formed at an end part at the Y-axis negative side of a second attaching part A12 of the second housing before joining. The interference part i1 protrudes from a surface (a surface opposing the second attaching part A12) 17A at the Z-axis negative direction side of the first attaching part A11 to the Z-axis negative direction side. The interference part i2 protrudes from a surface (a surface opposing the first attaching part A11) 18A at the Z-axis positive direction side of the second attaching part A12 to the Z-axis positive direction side. The interference part i1 and the interference part i2 oppose each other in the Z-axis direction.

In the modified example, the surface 17A at the Z-axis negative direction side of the first attaching part A11 of the first housing before joining is not inclined with respect to a horizontal surface H3. On the other hand, a surface 19A at the Z-axis positive direction side of the first attaching part A11 is inclined toward the Z-axis negative direction side with respect to a horizontal surface H5. Similarly, the surface 18A at the Z-axis negative direction side of the second attaching part A12 of the second housing before joining is not inclined with respect to a horizontal surface H4, and a surface 16A at the Z-axis positive direction side is inclined toward the Z-axis positive direction side with respect to a horizontal surface H6.

Figure 17:
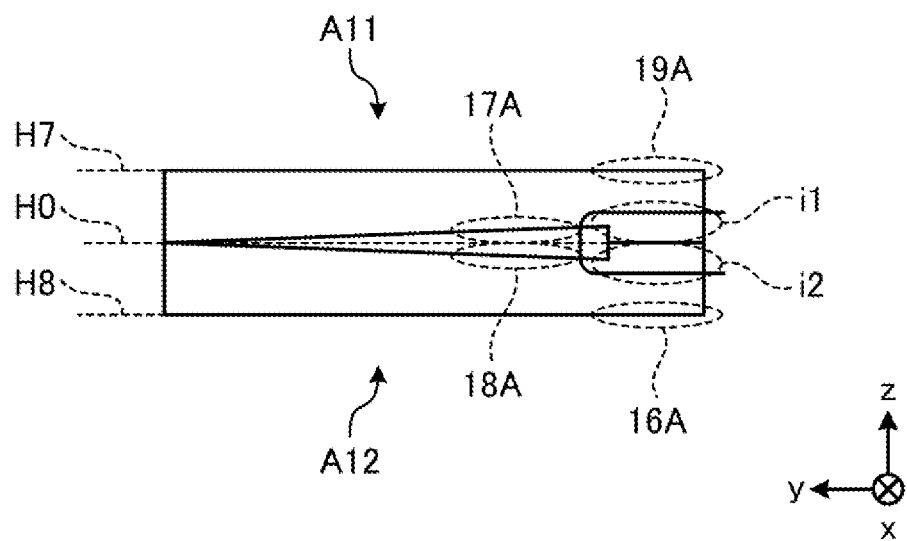
FIG. 17 is an enlarged side view illustrating an example of an attaching part of the rotating device after joining according to the modified example.

FIG. 17 is a side view illustrating an example of the attaching parts of the rotating device after joining in the modified example. In the rotating device after joining, for example, the surface 19A of the first attaching part A11 is elastically deformed and becomes substantially flush with a horizontal surface H7, and thus stress is generated inside the first attaching part A11. Similarly, stress is also generated in the surface 16A of the second attaching part A12 caused by becoming substantially flush with a horizontal surface H8. Further, stress is also generated by the interference part i1 and the interference part i2 pressing against each other in the Z-axis direction. At this time, as illustrated in FIG. 17, the surface 17A and the surface 18A are deformed to be inclined with respect to a horizontal surface H0. In this case, as illustrated in FIG. 17, for example, the surfaces 17A and 18A may be configured so as not to be in contact with each other at a part other than the interference parts i1 and i2.

Embodiments and modified examples of the present invention have been described, but the present invention is not limited to the embodiments and modified examples, and various modifications are possible without departing from the spirit of the present invention. Various modifications within a scope that does not depart from the gist are included in the technical scope of the present invention, and this is obvious to a person having skill in the art from the description of the claims.

The rotating device described in the embodiments and modified examples can be used as, for example, an actuator for driving a plurality of switching doors (louvers) provided midway through an air passage of a vehicular air conditioning device system such as DC-HVAC (heating ventilation and air conditioning), an actuator for driving an electric mirror or an electric sheet, and an actuator used in EPB (electronic parking braking).

REFERENCE SIGNS LIST 1, 1a Rotating device, 2, 2a Housing, 3 Motor, 4 Connection terminal, 5 Output gear, 6 Gear group, 7 Sensor, 8 Wiring board, 11, 91, A11 First attaching part, 12, 92, A12 Second attaching part, 13, 14 Connecting hole, 17, 18 Inclined surface, 21 First housing, 22 Second housing, 28 Projected part, 93 Insertion hole, 94 Hole part, 95 Protruding part, 97, 98 (Opposing) surface, 200 Connector part, 210 First surface part, 211 First sidewall part, 212 Engagement part, 219 Projected part, 220 Second surface part, 221 Second sidewall part, 222 Engagement projection, 229 Projected part, 281 First through-hole, 282 Second through-hole, 31 Rotation shaft, 32 Worm gear, 51 Output shaft, 61 First transmission gear, 62 Second transmission gear, 611 Helical gear, 612 Small diameter gear, 621 Helical gear, 100 Air conditioning system

The invention claimed is:

1. A rotating device comprising:
  a motor;
  a gear; and
  a housing configured to accommodate the motor and the gear, wherein
    the housing includes a first housing and a second housing,
    the first housing includes a first attaching part attached to an external device,
    the second housing includes a second attaching part attached to the external device,
    the first attaching part and the second attaching part include surfaces opposing each other, and
    the surface of the first attaching part or the surface of the second attaching part includes an interference part,
    in a direction from one of the first housing and the second housing toward the other, A1, A2, and B have a relationship of $0.02(A1+A2) \leq B \leq 2(A1+A2)$, A1 being a thickness of the first attaching part, A2 being a thickness of the second attaching part, and B being an interference amount at the interference part.

2. The rotating device according to claim 1, wherein
  in a direction from one of the first housing and the second housing toward the other, A1 is a thickness of the first attaching part, A2 is a thickness of the second attaching part,
  the first attaching part includes an inclination from the first housing toward the second housing and an outer edge part,
  the second attaching part includes an inclination from the second housing toward the first housing and an outer edge part,
  B1 is an inclination amount at the outer edge part of the first attaching part,
  B2 is an inclination amount at the outer edge part of the second attaching part, and
  A1, A2, B1, and B2 have a relationship of $0.02(A1+A2) \leq B1 \leq B3 \leq 2(A1+A2)$.

3. The rotating device according to claim 1, wherein
  the first attaching part and the second attaching part include surfaces opposing each other, and
  a bonding member is provided between the surface of the first attaching part and the surface of the second attaching part.

4. The rotating device according to claim 3, wherein the bonding member has elasticity.

5. The rotating device according to claim 1, wherein
  the first attaching part is formed at the outer peripheral surface of the first housing, and
  the second attaching part is formed at the outer peripheral surface of the second housing.

* * * * *